United States Patent [19]
Kamiya et al.

[11] Patent Number: 5,851,633
[45] Date of Patent: Dec. 22, 1998

[54] RESIN-MOLDED PRODUCT AND METHOD OF MANUFACTURING THE SAME

[75] Inventors: Chiharu Kamiya, Anjo; Yoshihide Kanai, Toyota, both of Japan

[73] Assignees: Nippondenso Co., Ltd; Shimizu Industry Co., Ltd, both of Kariya, Japan

[21] Appl. No.: 648,706

[22] Filed: May 16, 1996

[30] Foreign Application Priority Data

May 16, 1995 [JP] Japan ................................ 7-117401

[51] Int. Cl.⁶ ........................................................ B32B 3/00
[52] U.S. Cl. ........................... 428/158; 428/156; 264/273
[58] Field of Search ..................... 428/156, 158; 264/273

[56] References Cited

U.S. PATENT DOCUMENTS

| | | | |
|---|---|---|---|
| 3,901,964 | 8/1975 | Rubright | 264/255 |
| 4,994,226 | 2/1991 | Nakagawa et al. | |
| 5,690,881 | 11/1997 | Horie et al. | 264/263 |

FOREIGN PATENT DOCUMENTS

| | | |
|---|---|---|
| 0380385 | 8/1990 | European Pat. Off. |
| 0475198A2 | 3/1992 | European Pat. Off. |
| 0676267A1 | 10/1995 | European Pat. Off. |
| 3836541 | 5/1990 | Germany. |

OTHER PUBLICATIONS

Patent Abstracts of Japan; vol. 012, No. 292 (M–792), Aug. 1988; Re: JP 63 068420 A (Nippon Plast Co., Ltd.) Mar. 1988: *Abstract; Figures 1–4,7*.

Patent Abstracts of Japan: vol. 008, No. 166 (M–314), Aug. 1984: Re: JP 59 062776 A (Nissan Jidosha KK; Others:01), Apr. 1984: *Abstract; Figures*.

*Primary Examiner*—Melvyn I. Marquis
*Assistant Examiner*—D. Aylward
*Attorney, Agent, or Firm*—Pillsbury Madison & Sutro

[57] ABSTRACT

Packing is fixed to and adheres to a molded damper on the outer periphery of the both sides of the damper body like a frame. To prevent defective molded products, a portion of the damper body having the packing disposed thereon is made thicker than a portion without the packing so that resin can flow into the portion where the packing is disposed before it goes into the portion without the packing.

16 Claims, 12 Drawing Sheets

PRIOR ART

RESIN-MOLDED PRODUCT AND METHOD OF MANUFACTURING THE SAME

CROSS-REFERENCE TO RELATED APPLICATION

The present application is related to and claims priority from Japanese Patent Application No. Hei 7-117401, incorporated herein by reference.

BACKGROUND OF THE INVENTION

1. Field of the Invention

The present invention relates to a resin-molded product, where a porous elastic member which functions as packing is disposed on the outer periphery of the surface of the body of the resin-molded product, and a method for manufacturing the resin-molded product.

A resin-molded product manufactured according to the present invention is especially suitable for a resin-molded product controlling flow of air where air-tightness is required. For example, it can be used in an automotive air conditioner as a switching damper for vents to the chamber of a vehicle, a switching damper for taking in inside/outside air, or an air mixing damper for regulating the temperature of the air blown into the chamber. A resin-molded product manufactured according to the present invention is also applicable to an automotive air conditioner.

2. Description of the Related Art

Figure 14:
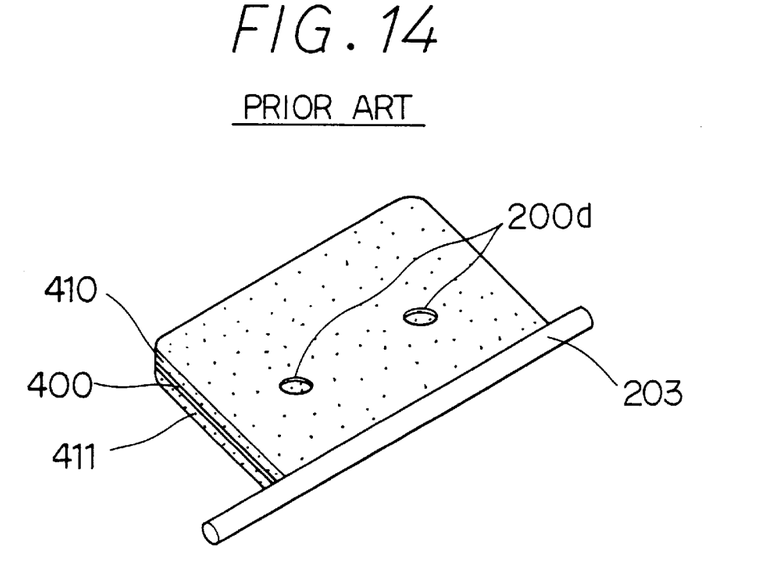
FIG. 14 is a perspective view of a resin-molded product for controlling air flow according to the prior art.

An air inlet switching damper for taking in inside/outside air conventionally has packing 410 and 411 fixed on the entire surface of a damper body 400 as shown in FIG. 14 to provide air-tightness when the damper seats on a frame (not shown). As for a method of manufacturing such an air inlet switching damper, U.S. Pat. No. 4,994,226 discloses a technology to fix and adhere packing to the entire surface of the damper body 400 with a molded air inlet switching damper.

In this technique, an air inlet switching damper rotates on a shaft 203 disposed at an edge thereof and it opens or closes an inside/outside air inlet (not shown) by closing the inside/outside air inlet frame with the damper body 400. That is, only packing disposed on the outer periphery of the damper body 400 is required to provide air-tightness with the inlet, but the other portion (the center) does not need the packing. Accordingly, the amount of wasted packing for this air inlet switching damper is high, and the cost thereof is relatively high.

SUMMARY OF THE INVENTION

In light of the above-described problem, the present invention has an object of providing a resin-molded product having a lower material cost by fixing and adhering a porous elastic member only to the portion requiring such a member to provide air-tightness.

The above object is achieved according to a first aspect of the present invention by providing an air damper for controller air flow which includes a damper body having packing disposed thereon. In contrast to the prior art where the packing covers the entire surface of the body, packing in the damper body according to the present invention is disposed only on the portion of the body which is for forming an airtight seal with another member. In this way, packing is not unnecessarily used on other portions of the body, thereby reducing its cost of manufacture.

The packing member disposed on the damper body may be cut from a sheet of such material in the same shape that it will be disposed on the damper body; however, it is preferably cut in several segments which are selected so that they may be placed closely together on the sheet of packing material. For example, the packing members may be cut as interlocking "J" shapes which are placed end-to-end on the damper body to form a frame-like structure around its periphery, or they may be cut as straight segments which are placed end-to-end as sides of the frame.

Preferably, the portions of the damper body having the packing affixed thereto are thicker than the remaining portions of the damper body, thereby providing additional structural integrity. These thick portions may also serve as resin guide paths for guiding resin through a mold when the damper body is being molded.

The above object is achieved according to another aspect of the present invention by providing a method for manufacturing a damper for controlling the flow of air as described above.

Other objects and features of the invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

A first preferred embodiment of the present invention is hereinafter described with reference to the accompanying drawings.

Figure 2:
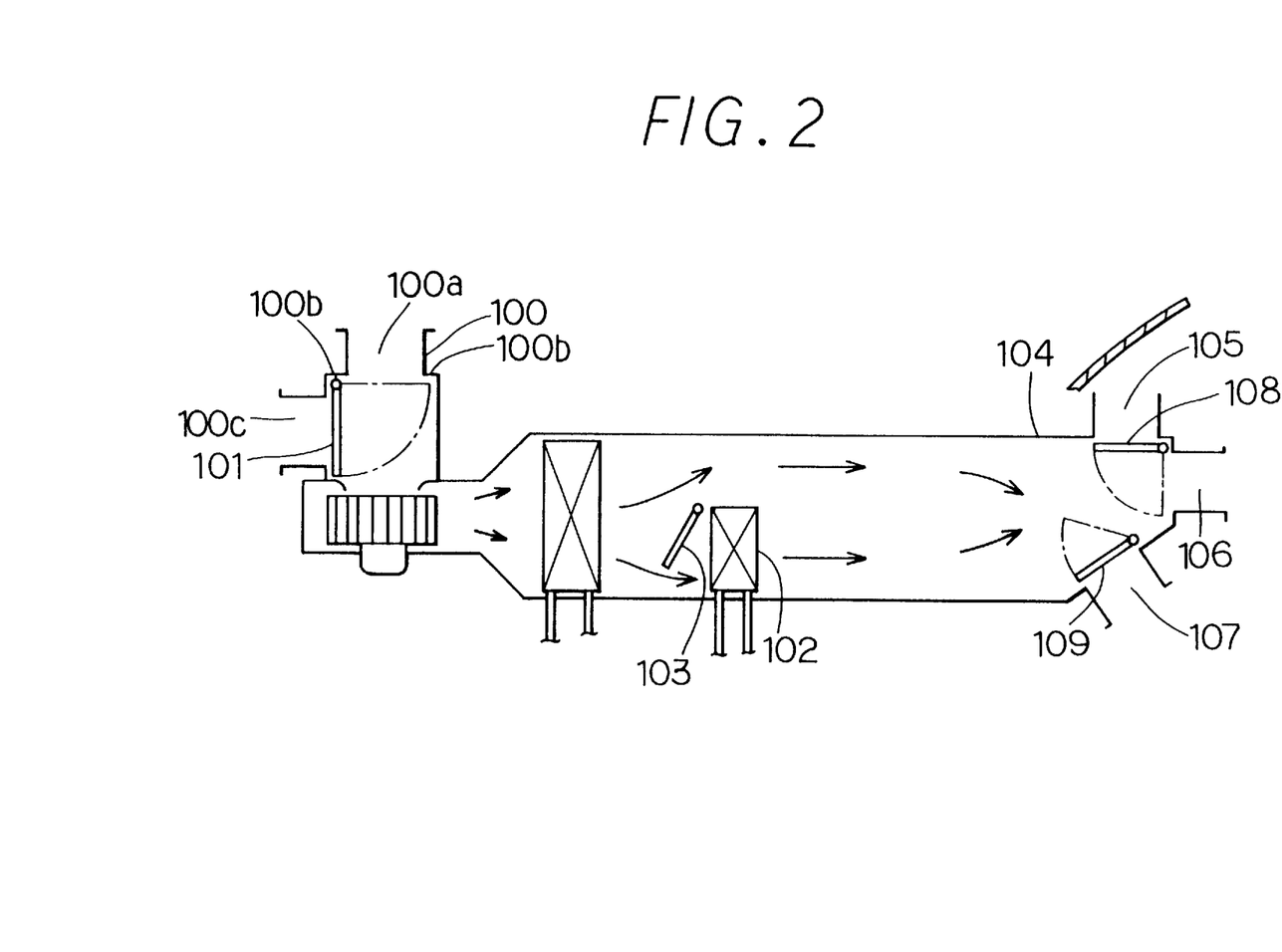
FIG. 2 is a schematic view of an example where a resin-molded product for controlling air flow is applied according to the first embodiment.

FIG. 2 is an overall diagram of an automotive air conditioner using a damper according to the first embodiment as an air flow control damper. In this Figure, an inside/outside air switching portion 100 has an outside air inlet 100a and an inside air inlet 100c at an upper portion thereof. An inside/outside air switching damper 101 for opening and closing the outside air inlet 100a and the inside air inlet 100c is disposed in the inside/outside air switching portion 100.

A heater core 102 has an air mixing damper 103 upstream therefrom for adjusting the amount of air passing through the heater core 102. As it is widely known, air temperature inside a vehicle passenger compartment can be adjusted by adjusting the air mixing damper 103.

A switching portion 104 for vents to the passenger compartment has a defroster outlet 105 at the upper portion thereof for eliminating cloudiness of the front glass. A face air outlet 106 is provided for blowing the air toward the upper part of a passenger's body. A foot air outlet 107 for blowing out the air toward the lower part of the passenger's body is disposed at the lower portion of the switching portion 104. Dampers 108 and 109 switchably control outlets 105 and 106, and 107, respectively.

Figure 1:
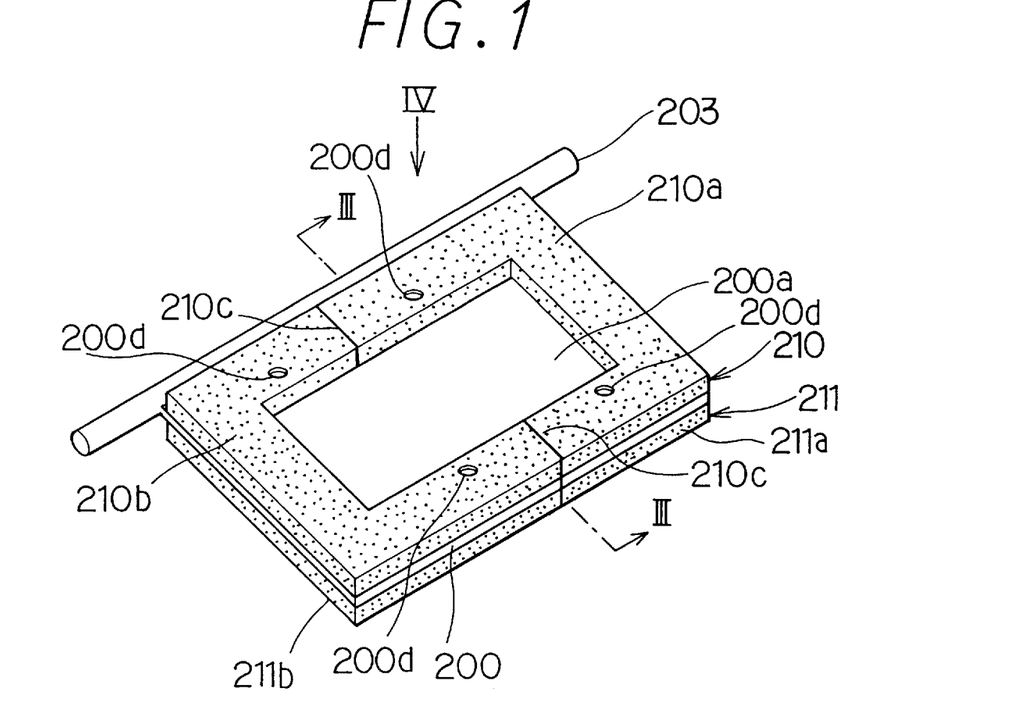
FIG. 1 is a perspective view of a damper according to a first embodiment of the present invention.

FIG. 1 shows the structure of the damper 101 according to the present invention in greater detail. In this Figure, a damper body 200 is molded with thermoplastic synthetic resin (for example, polypropylene or nylon). At one edge of the damper body 200, a shaft 203 as a rotational axis of the damper 101 is integrally molded with the damper body 200. The damper 101 rotates on the shaft 203 to open and close the outside air inlet 100a. Packing 210 and 211 of porous elastic material divided into the shape of a square are respectively disposed on the front and back of the damper body 200. Each of the packing 210 and 211 is fixed on the outer periphery of the damper body 200 like a frame and adheres to the molded damper 101. Marks of injected resin 200d showing the shot marks of molten thermoplastic synthetic resin (hereinafter called "resin") at the time of molding remain on the surface of the packing 210.

Figure 3:
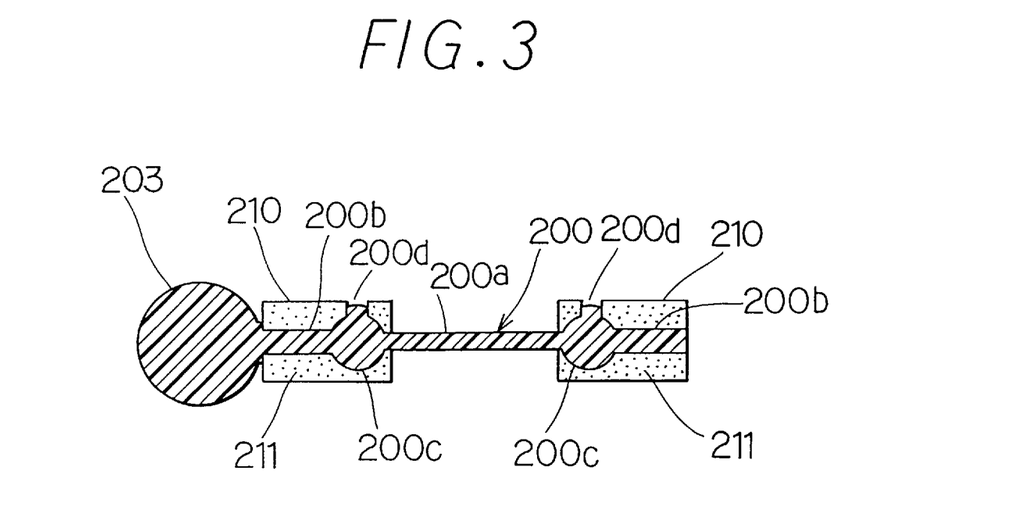
FIG. 3 is a cross-sectional view taken along line III—III of FIG. 1.
Figure 4:
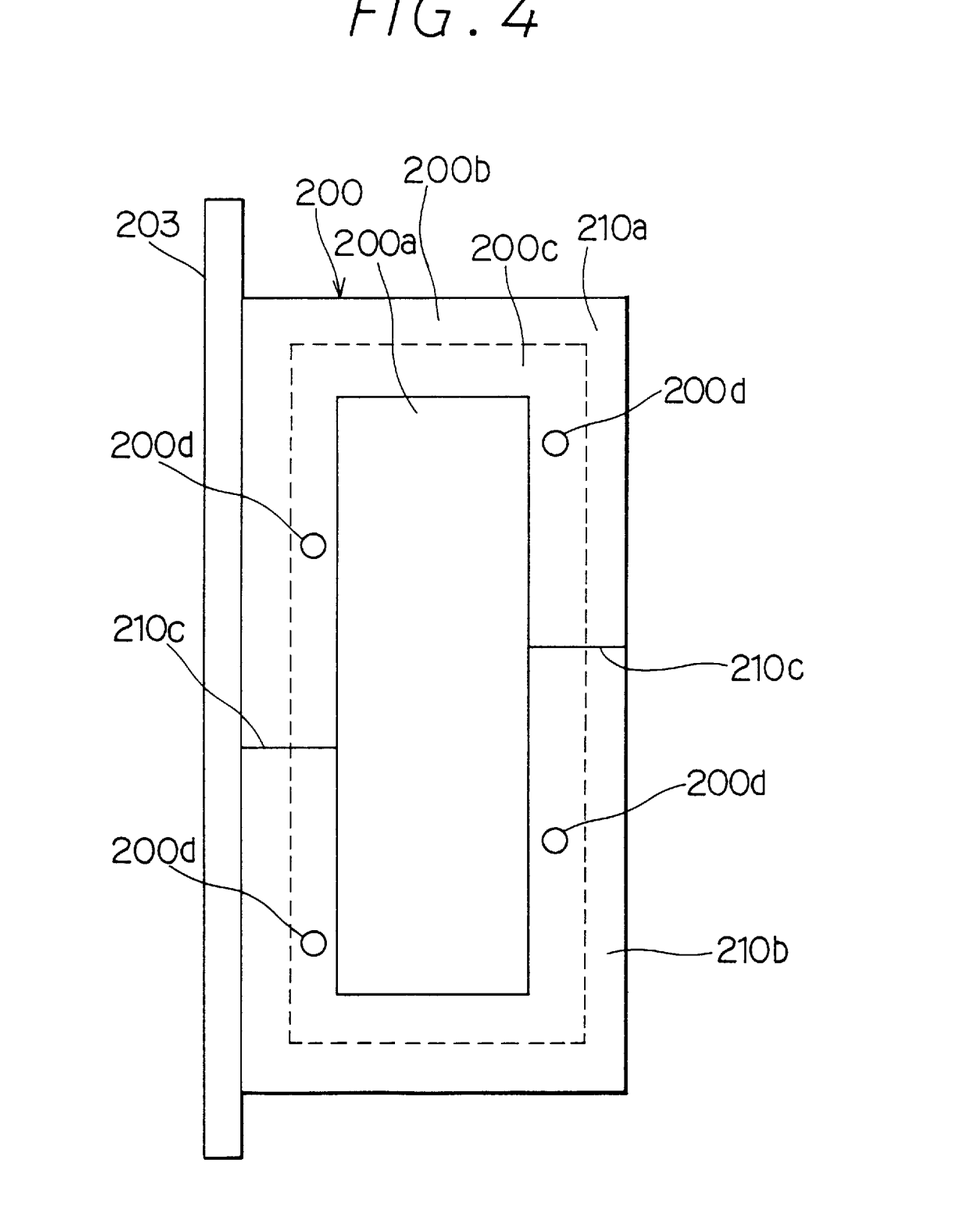
FIG. 4 is a view taken from the direction of arrow IV in FIG. 1.

In the cross-sectional view of the damper body 200 shown in FIG. 3, portions 200c having marks of injected resin 200d are the thickest portions on the entire surface of the packing 210. The next thickest portions are the frame portions 200b, and the thinnest portions are the portions without the packing 210 and 211. Serving as a rib in the shape of a square as shown in FIG. 4, the portions 200c can contribute to improving torsional rigidity and bending rigidity of the damper body 200.

When the damper 101 rotates on the shaft 203 from the opened condition of the outside air inlet 100a (in FIG. 2) to closed condition of the outside air inlet 100a, a portion of the packing 210 completely contacts with an outer periphery 100b of the outside air inlet 100a. Accordingly, even if the other portion (the center 200a) does not have the packing 210 and 211, the damper 101 can securely seal the inlet 100a. Material for the packing 210 and 211 can be reduced by the area of the center 200a, which permits a reduction in the material cost of the packing 210 and 211 for the damper 101.

Figure 5:
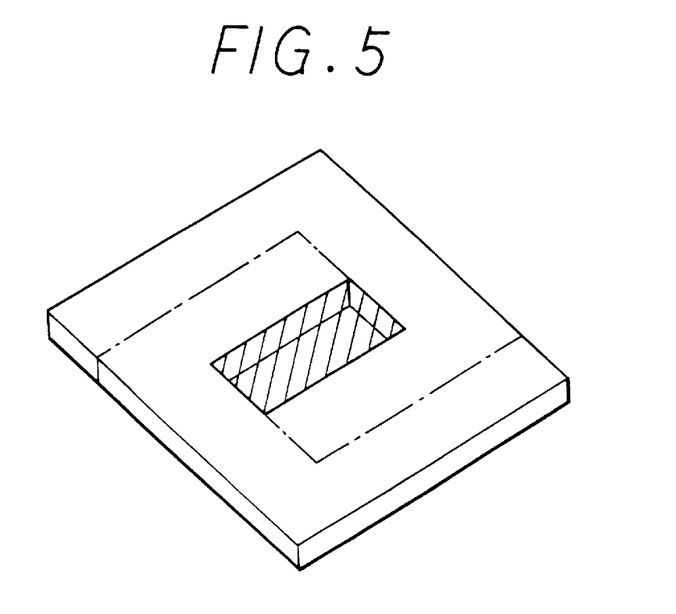
FIG. 5 is a perspective view of packing before dividing it according to the first embodiment.
Figure 6:
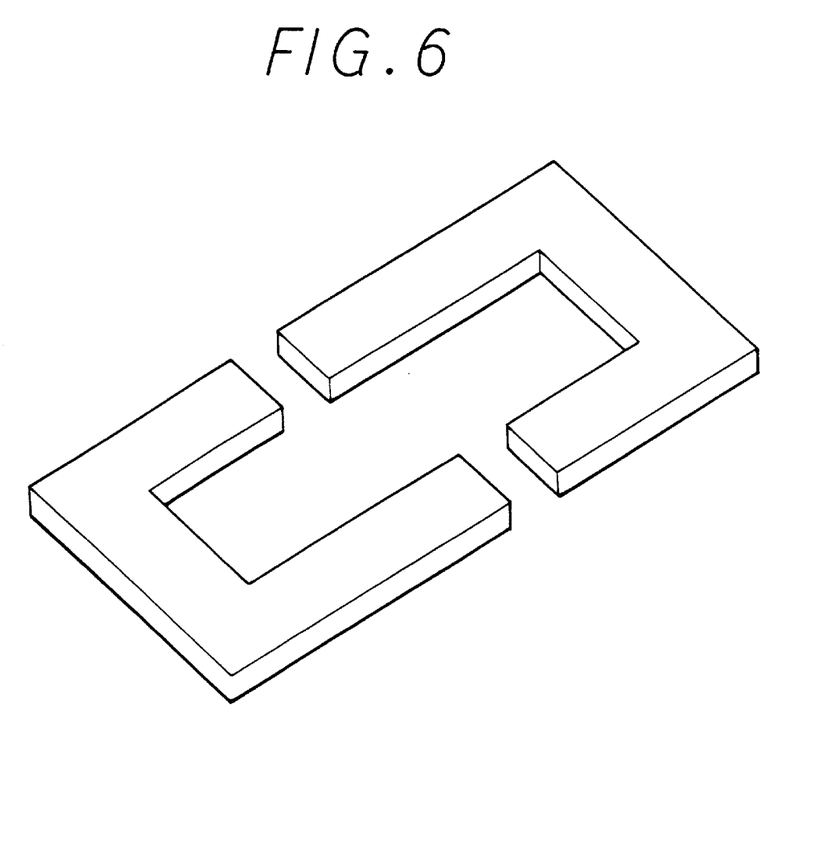
FIG. 6 is a perspective view of the packing after dividing it according to the first embodiment.

A method of manufacturing the damper 101 is hereinafter described. First, by cutting a rectangular-shaped packing material (drawn in a solid line) as shown in FIG. 5 into the shape shown with a one-dot line, two of the packing members 210a, 210b, 211a and 211b in the shape of a letter "J" are taken out of course, by cutting two such sheets, all four members 210a, 210b, 211a, 211b can be made.

Figure 7:
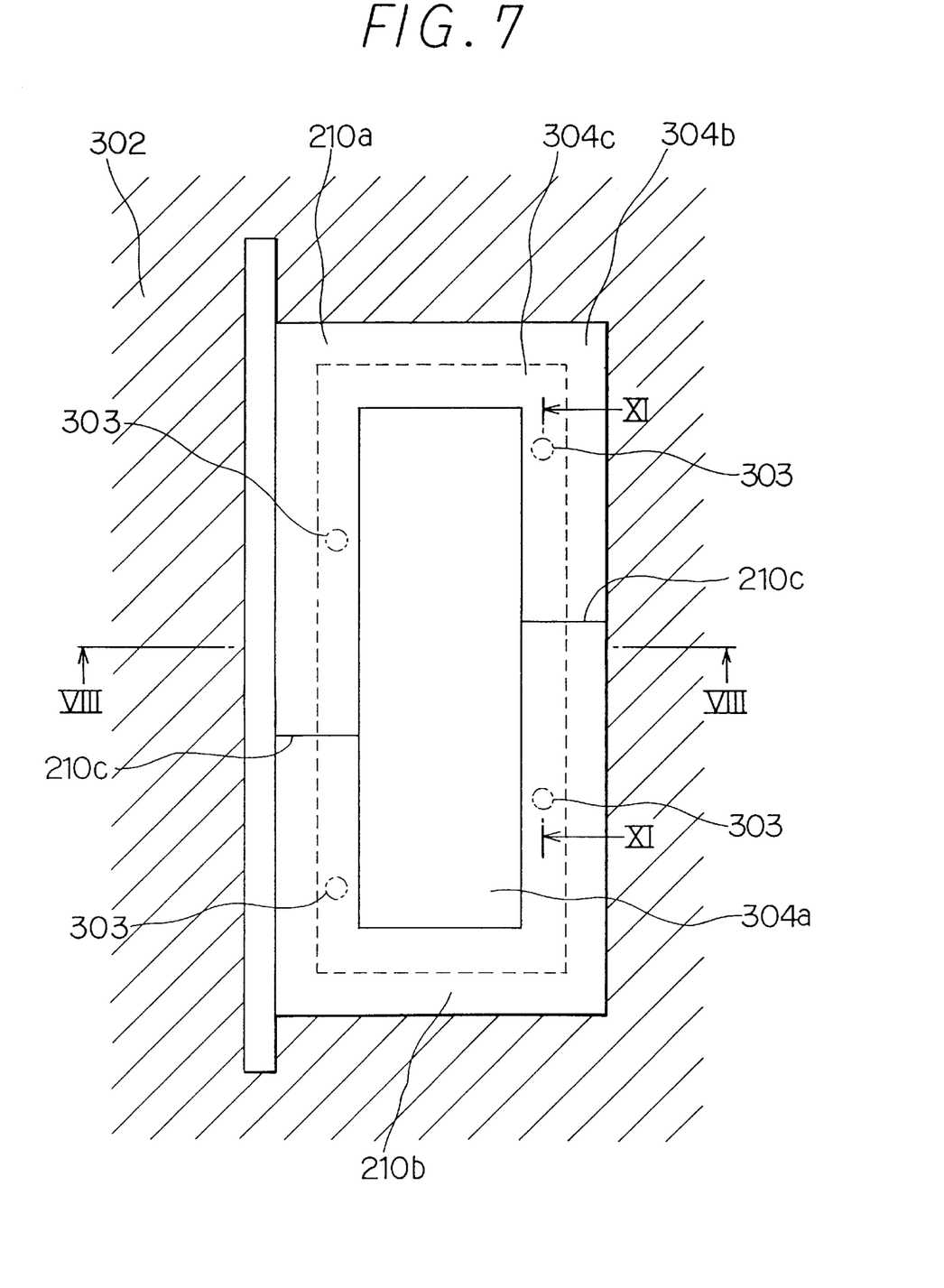
FIG. 7 is a cross-sectional view taken along the parting surface of a mold for molding resin when the packing is disposed on the mold according to the first embodiment.
Figure 8A:
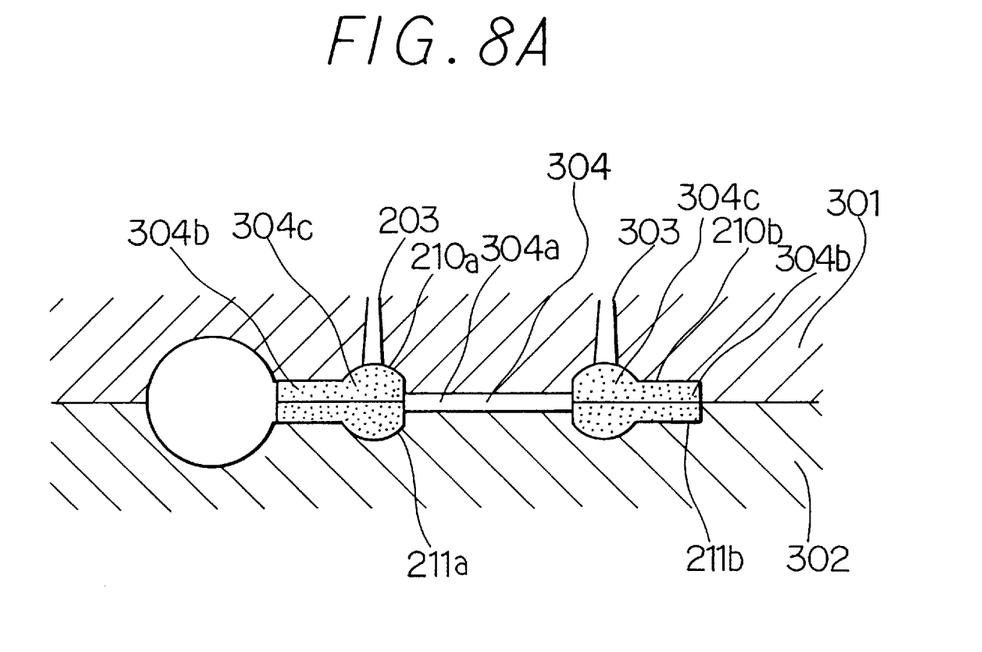
FIGS. 8A–BD are cross-sectional views taken along line VIII—VIII of FIG. 7 to show clamping conditions according to the embodiment.

The J-shaped packing members 210a, 211a, 210b, and 211b are then disposed like a frame on the periphery of the lower mold 302 of resin-molding molds as shown in FIG. 7. Next, the upper mold 301 of the resin-molding molds is placed on the lower mold 302 to pressurize and clamp the packing members 210a, 210b, 211a, and 211b as shown in FIG. 8A. Out of an in-mold space 304 formed with the upper and the lower molds 301 and 302, in-mold spaces 304b and 304c are occupied with the packing members 210a, 210b, 211a, and 211b. In decreasing order of height, the parts of the in-mold space 304 are the in-mold spaces 304c, 304b and 304a. The in-mold space 304c is formed in the shape of a square on the entire periphery of the space for disposing the packing 210 as shown in FIG. 7.

Molten resin is injected into the in-mold space 304 through a resin inlet 303 disposed on the upper mold 301. More specifically, four (shown in FIG. 7) resin inlets 303 are disposed on the upper mold 301 along the in-mold space 304c containing the packing 210. Two adjacent resin inlets 303 are substantially symmetrical with respect to the parting face 210c between the packing members 210a and 210b. The in-mold space 304 then is gradually filled with molten resin injected in the third process.

Figure 8B:
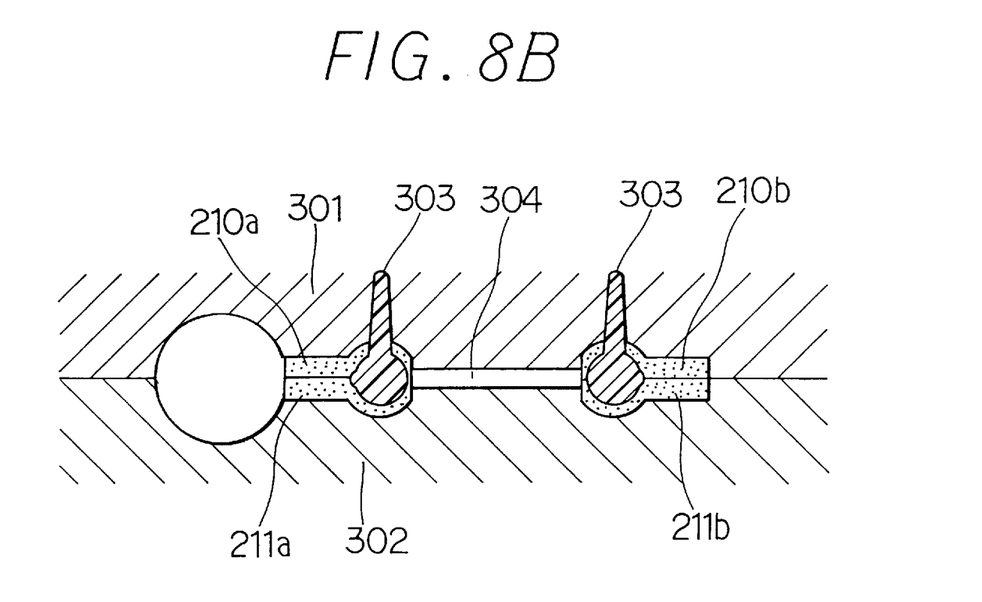
Figure 9:
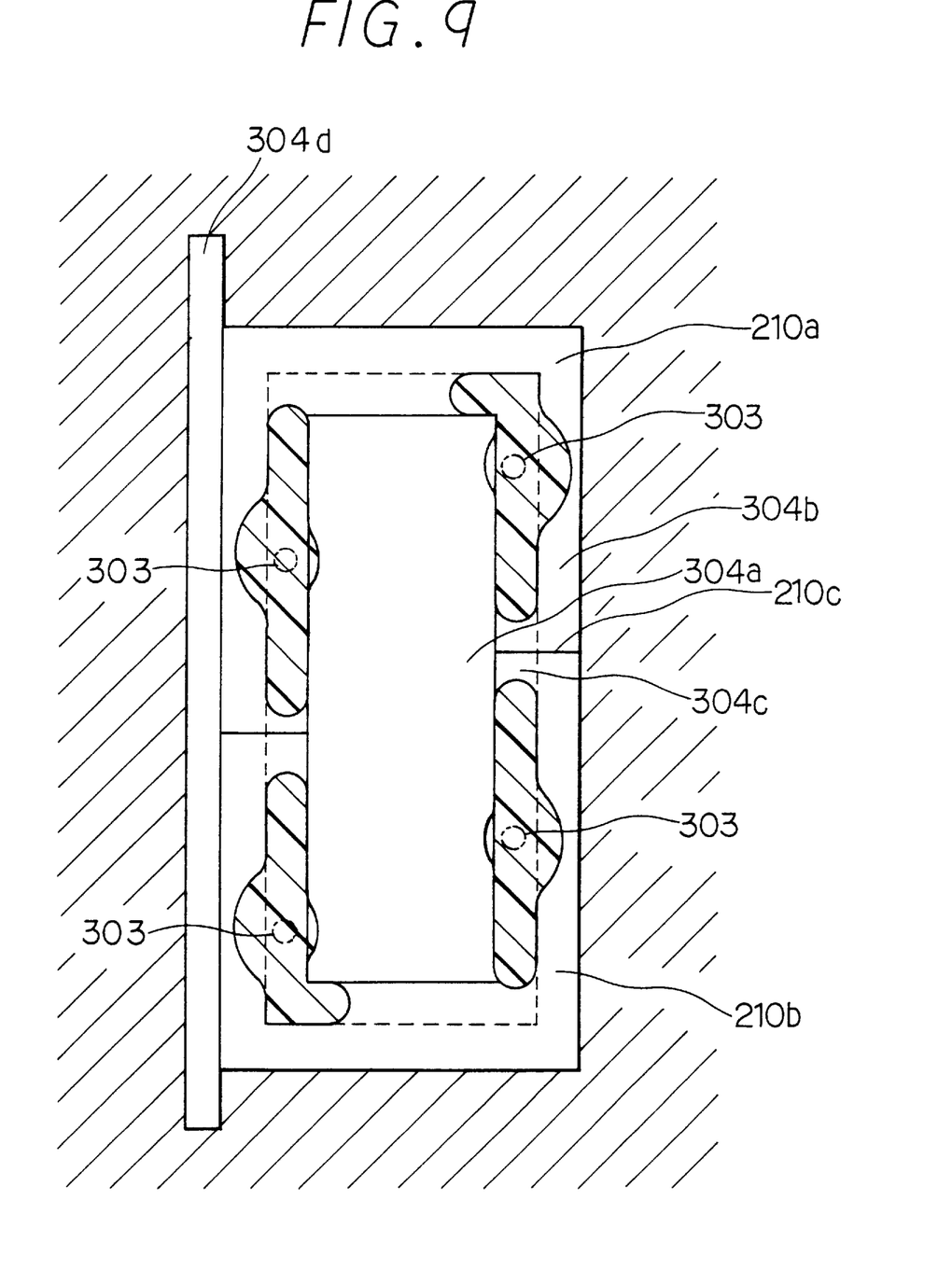
FIG. 9 is a cross-sectional view of a damper during a resin filling process according to the first embodiment.
Figure 11A:
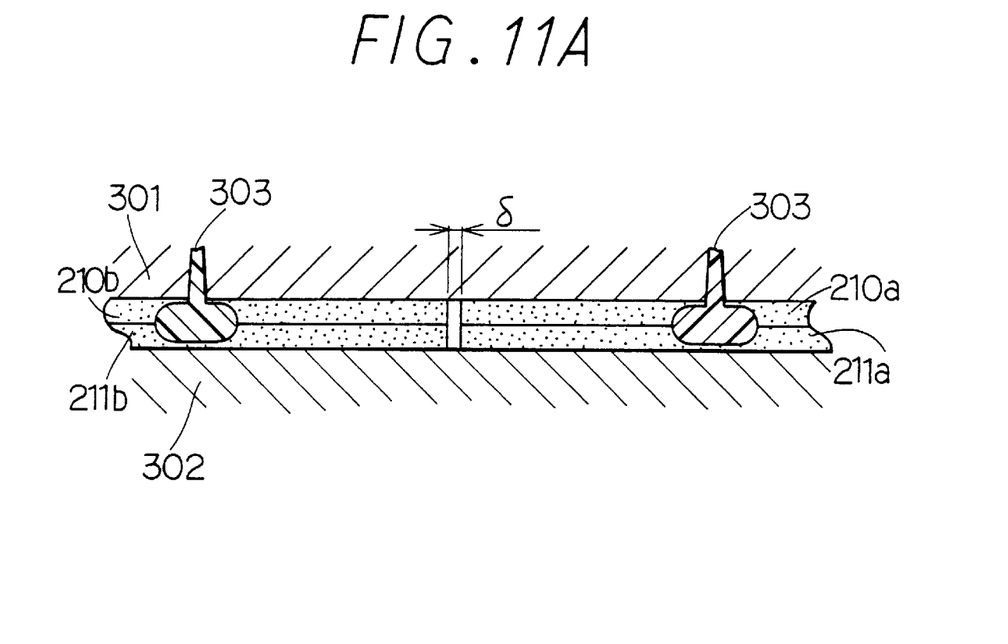
FIGS. 11A–11C are cross-sectional views taken along line XI—XI of FIG. 7 showing stages in the resin filling process according to the first embodiment.

After resin injected from the resin inlet 303 first passes through the packing 210 and goes into the boundary surface between the packing 210 and 211 as shown in FIGS. 8B and 11A, it flows along the in-mold space 304c to fill up the in-mold space 304c as shown in FIG. 9. The resin filling the in-mold space 304c forms a portion of the aforementioned rib 200c. The in-mold space 304c is hereinafter called a resin guiding space (i.e., a flow leader or flow channel).

FIGS. 8B and 11A are schematic views of the flow of the resin. FIG. 9 shows an analytical result of the flow of the resin based on a finite-element method.

Figure 8C:
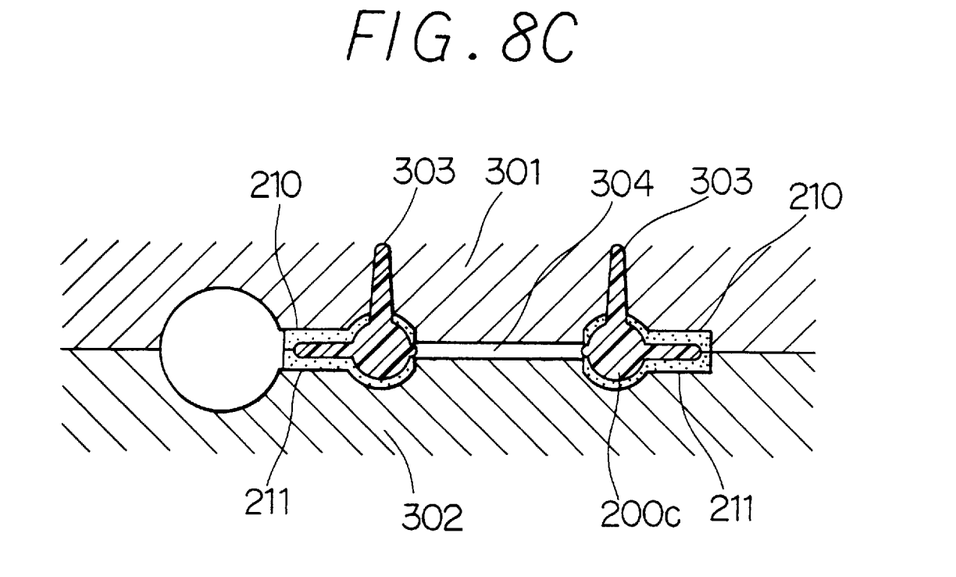
Figure 8D:
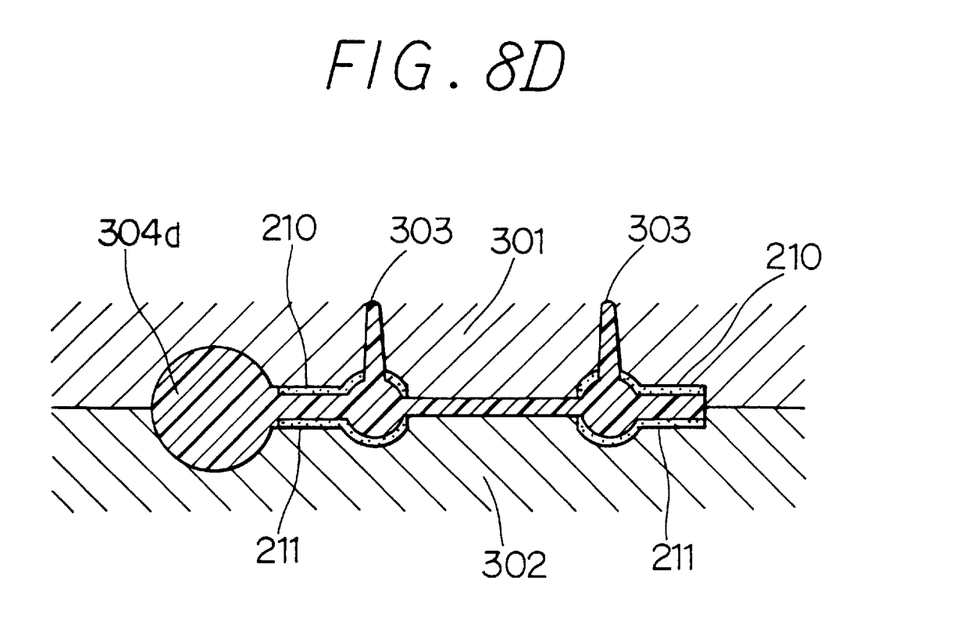
Figure 10:
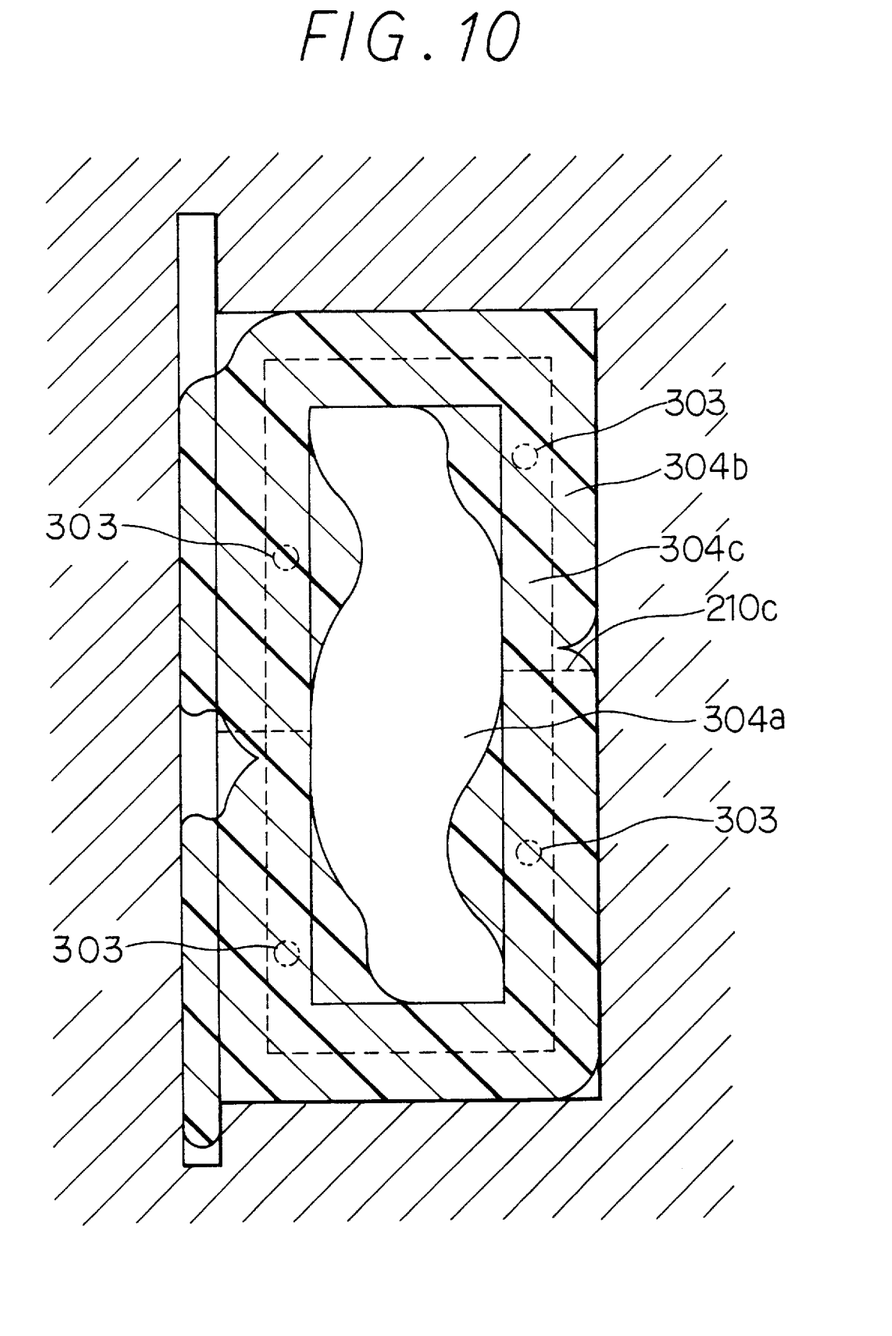
FIG. 10 is another cross-sectional view of a damper during a resin filling process according to the first embodiment.
Figure 11B:
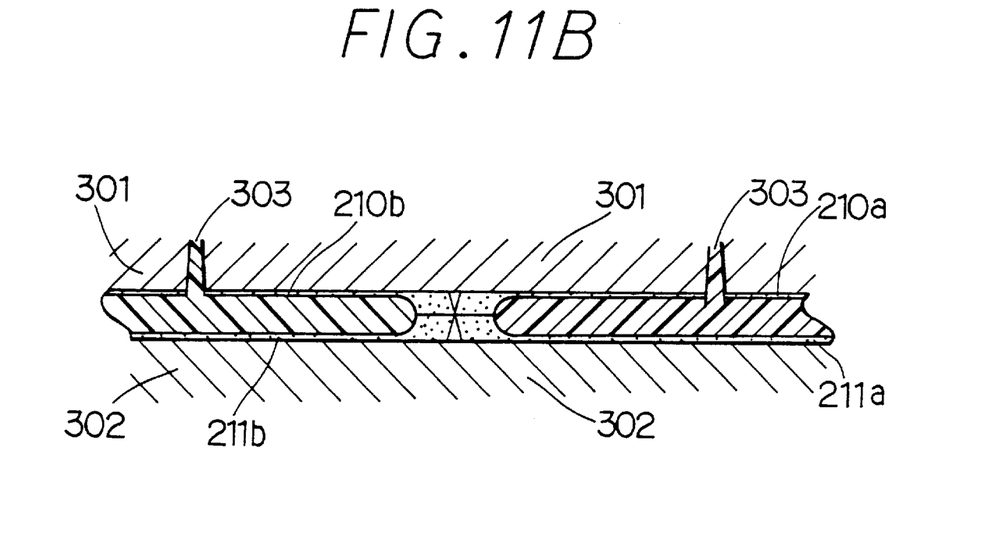
Figure 11C:
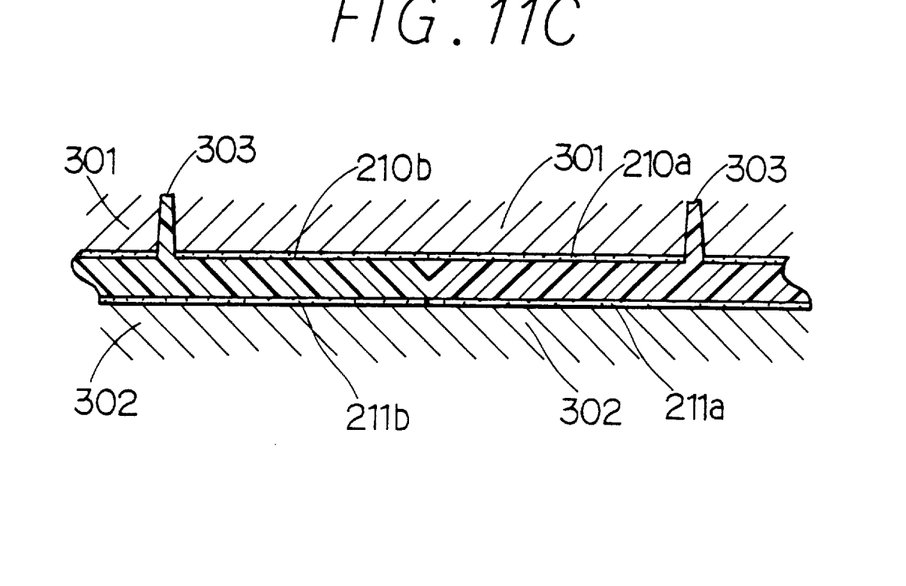

After the resin guiding space 304c is almost filled up with the resin, the resin flows into the in-mold space 304b as shown in FIGS. 8C and 10. While flowing along the boundary surface between the packing 210 and 211, the resin pushes each of the packing 210 and 211 on the mold surface as shown in FIG. 11B. Since a portion of the resin goes into small holes of the packing 210 and 211, the damper body 200 firmly adheres to the packing 210 and 211. FIGS. 8C and 11B are schematic views of the flow of the resin. FIG. 10 shows an analytical result of the flow of the resin based on a finite-element method. The resin then spreads further and fills up the in-mold space 304a and the in-mold space 304d forming the shaft 203 to complete the resin filling process. FIGS. 8D and 11C show the conditions when the in-mold space 304 is completely filled with the resin.

After the above-specified processes, the resin-molded product is taken out of the in-mold space 304 for a finishing process to remove flash and for a product inspection process to complete the process of manufacturing the damper 101.

The features of the manufacturing method according to the first embodiment are hereinafter described.

Figure 12:
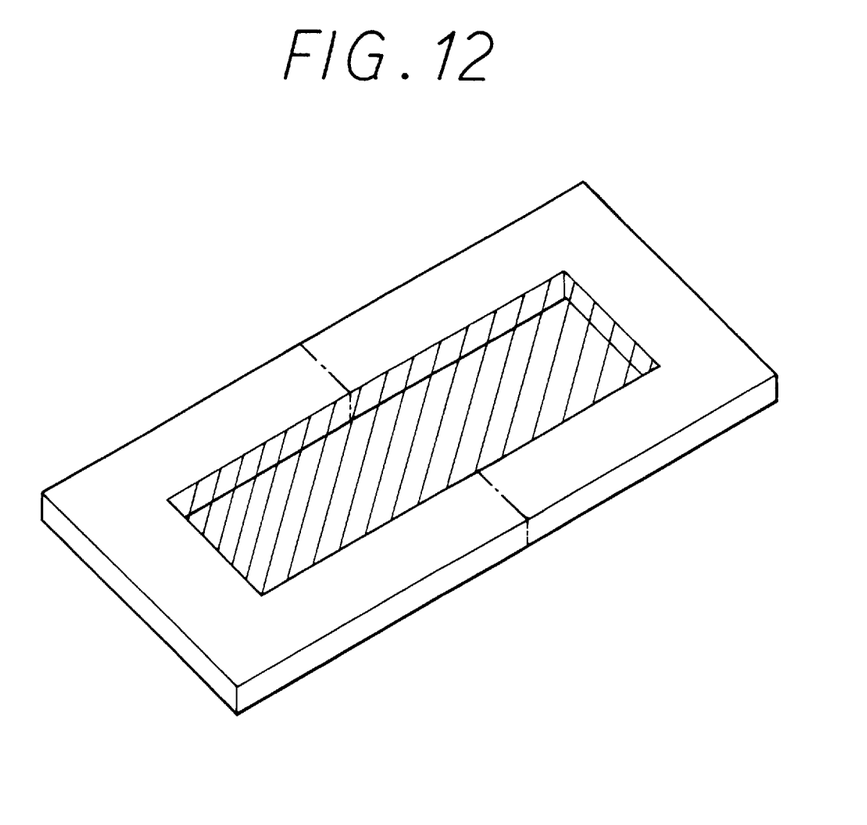
FIG. 12 is a perspective view explaining how to cut the packing in the first embodiment.

In the first process, J-shaped packing members 210a, 210b, 211a, and 211b are taken out by cutting two sheets of the rectangular packing material shown in FIG. 5 (with a solid line) into the shape shown with a one-dot line, which reduces waste of the packing material. If the rectangular packing material (drawn with a solid line) in FIG. 12 is cut as shown with a one-dot line, the center (the shaded portion) of the packing material is wasted. Therefore, the present embodiment can better reduce the material cost.

By injecting the resin from the portion where the packing 210 is disposed and also making the in-mold space 304b where the packing 210 is disposed higher than the in-mold space 304a where the packing 210 is not disposed, the flow of the resin can be controlled so that the resin can flow into the in-mold space 304b where the packing 210 is disposed before it goes into the in-mold space 304a. In addition, by making the resin guiding space 304c, the resin can be more securely controlled to flow into the in-mold space 304b where the packing 210 is disposed before flowing anywhere else. Accordingly, since the resin flows into the in-mold space 304a where the packing 210 is not disposed after going along the boundary surface between the packing 210 and 211, such reversing phenomena as the resin appears on the surfaces of the packing 210 and 211 can be reduced. Furthermore, the packing 210 and 211 disposed in the shape of a frame can be firmly fixed to the damper body 200 at a predetermined position with predetermined dimensional accuracy, which contributes to the reduction of defective dampers 101.

Since two adjacent resin inlets 303 are disposed almost symmetrically with respect to the parting face 210c between the packing members 210a and 210b, the packing 210 and 211 are strained in the direction to fill a clearance between adjacent ends of the packing members 210a and 210b or 211a and 211b with the flow of the resin as shown in FIGS. 11A–11C. Even if a small clearance (approximately 1.5–2.0 mm) between the packing members 210a and 210b as well as 211a and 211b exists when the packing members 210a, 210b, 211a, and 211b are disposed in the mold 302, the clearance can be zero at the completion of the resin filling process. The number of defective products caused by inaccurate cutting of porous elastic members and inaccurate disposition thereof can be consequently reduced.

An allowance of asymmetry of the resin inlets 303 with respect to the parting face 210c is approximately ±20 mm according to a research of the inventors. Asymmetry in this case means a difference between the distance from one resin inlet 303 out of two adjacent resin inlets 303 to the parting face 210c and the distance from the other resin inlet 303 to the parting face 210c. FIGS. 11A–11C are schematic views of the flow of the resin illustrating this feature.

A second preferred embodiment is hereinafter described.

Figure 13:
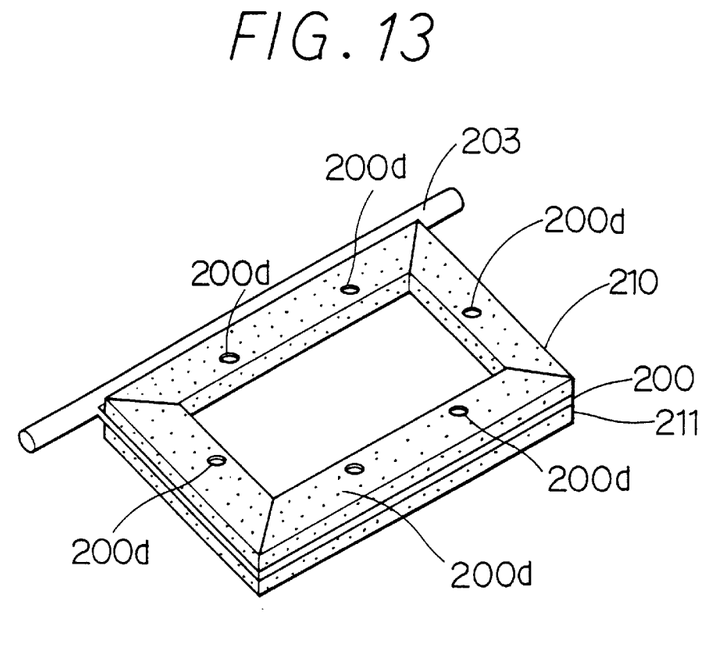
FIG. 13 is a perspective view of a second embodiment of the present invention.

Although the packing 210 and 211 are cut into a J shape, in the first embodiment, they can be cut into four portions to mold the damper 101 of the present invention as shown in FIG. 13 by using the same manufacturing method as in the first embodiment instead of cutting them into a J shape.

The in-mold space 304 does not necessarily have a stair-like shape as shown in FIG. 8A, but can be formed to increase its thickness continuously from the center to the edge to manufacture a resin-molded product of the present invention.

The method of manufacturing a resin-molded product according to the present invention does not have to be limited to manufacture a resin-molded product for controlling the flow of the air; rather, it is also applicable to the manufacture of resin-molded products for controlling other fluids (for example, water or oil).

The shape of the resin-molded product molded according to the manufacturing method specified in the present invention does not have to be limited to the shape of a damper shown in FIG. 1 but can be a curved surface or a disc shape.

In addition, the present invention can be employed for manufacturing the indicator panel of a vehicle and also for fixing porous members on the back of the indicator panel.

The fixing position of the packing does not necessarily have to be necessarily at the outer periphery of the body of the resin-molded product as shown in the first and second embodiments. Even if the packing is fixed on other positions (for example, only the center or only on one side of the body of a resin-molded product), the manufacturing method specified in the present invention can be employed.

The manufacturing method of the present invention can be also applied to manufacture a resin-molded product where the packing is disposed only on one surface of the body of the resin-molded product. Also, packing can be cut not only into two "J" shapes as shown in FIG. 1 or into four linear portions as shown in FIG. 13 but also can be cut into six or eight linear portions. Moreover, a resin guiding space can be disposed along the edge of the packing at the portion where packing is not disposed.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined by the appended claims.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A resin-molded product comprising:
   a resin-made body;
   a porous elastic member disposed on a surface of a portion of said resin-made body for providing an airtight seal, wherein said porous elastic member is disposed on a first area of said surface of said resin-made body and is not disposed on a second area of said surface of said resin-made body exclusive of resin inlets;
   wherein said porous elastic member disposed on said surface of said resin-made body is fixed to and adheres to said resin-made body with molten resin of said resin-made body sinking into a contact surface of said porous elastic member and wherein a portion of said resin-made body on which said porous elastic member is disposed is thicker than a portion of said resin-made body on which said porous elastic member is not disposed.

2. A resin-molded product according to claim 1, wherein said porous elastic member is divided into plural portions.

3. A resin-molded product according to claim 1, wherein said thickest portion of said resin-made body is molded on an entire periphery of a part of said portion where said porous elastic member is fixed.

4. A damper for controlling a flow of air, said damper comprising:
   a resin-made damper body molded in a substantially rectangular shape;
   a porous elastic member disposed on an outer periphery of said resin-made damper body as a frame to define a first area on said resin-made damper body where said porous elastic member is disposed thereon and a second area on said resin-made damper body exclusive of resin inlets where said porous elastic member is not disposed thereon;
   wherein said porous elastic member disposed on said surface of said resin-made damper body is fixed to and adheres to said resin-made damper body, and wherein said first area on which said porous elastic member is disposed on said resin-made damper body is thicker than said second area on which said porous elastic member is not disposed thereon.

5. A damper for controlling a flow of air according to claim 4, wherein said porous elastic member is fixed and adheres to both front and back sides of said resin-made damper body.

6. A damper for controlling a flow of air according to claim 4, wherein said porous elastic member is divided into plural portions.

7. A damper for controlling a flow of air according to claim 6, wherein said porous elastic member fixed to and adhering to said surface of said resin-made damper body as a frame is divided into two portions in a shape of "J" and is disposed on an outer periphery of said resin-made damper body.

8. A damper for controlling a flow of air according to claim 6, wherein said porous elastic member fixed to and adhering to said surface of said resin-made damper body as a frame is divided into four portions linearly and is disposed on an outer periphery of said resin-made damper body.

9. A damper for controlling a flow of air according to claim 4, wherein a thickest portion of said resin-made damper body is in a shape of a square on an entire periphery of a part of said portion where said porous elastic member is fixed.

10. A damper for controlling a flow of air according to claim 9, wherein a cross-sectional shape of said thickest portion is substantially circular.

11. A damper for controlling a flow of air according to claim 10, wherein a shaft having a diameter larger than a cross-section of said resin guiding portion is integrally molded with said resin-made damper body.

12. A method of manufacturing a resin-molded product where a porous elastic member disposed only on a portion of a resin-made body for forming an airtight seal is fixed and adheres to said resin-made body, said method comprising the steps of:

cutting said porous elastic member into a predetermined shape out of porous elastic member material;

disposing said porous elastic member at a predetermined position in an in-mold space formed by resin-molding molds;

injecting molten resin into a portion of said in-mold space where said porous elastic member is disposed in said in-mold space; and molding said resin-made body with injected resin and adhering said porous elastic member integrally to said resin-made body, wherein a space where said porous elastic member is disposed is farther from a center of said in-mold space than spaces of said in-mold space wherein said porous member is not disposed.

13. A method of manufacturing a resin-molded product according to claim 12, wherein a portion of said in-mold space farthest from a center of said in-mold space is formed as a resin guiding space on an entire periphery of a part of said in-mold space where said porous elastic member is disposed; and said injecting step includes a step of injecting said molten resin into said resin guiding space.

14. A method of manufacturing a resin-molded product according to claim 13, wherein a cross-sectional shape of said resin guiding space is substantially circular.

15. A method of manufacturing a resin-molded product, said method comprising the steps of:

cutting a porous elastic member into a predetermined shape out of porous elastic member material;

disposing said porous elastic member at a predetermined position on an outer periphery of an in-mold space formed by resin molding molds so that said porous elastic member is disposed at a portion of the in-mold space that is higher than any other portion of the in-mold space;

injecting molten resin into said in-mold space from a portion located almost symmetrically with respect to a parting face of said porous elastic member; and molding a resin-made body with injected resin and adhering said porous elastic member integrally to said resin-made body.

16. A method of manufacturing a resin-molded product according to claim 15, further comprising the steps of:

cutting an additional porous elastic member out of porous elastic member material; and disposing said additional porous elastic member on top of said porous elastic member inside said in-mold space;

wherein said molding step comprises a step of injecting said molten resin into a boundary surface between two-ply porous elastic members.

* * * * *